United States Patent
Wang et al.

(10) Patent No.: US 11,438,901 B2
(45) Date of Patent: Sep. 6, 2022

(54) RESOURCE ALLOCATION METHOD, TERMINAL, AND NETWORK SIDE DEVICE

(71) Applicant: CHINA ACADEMY OF TELECOMMUNICATIONS TECHNOLOGY, Beijing (CN)

(72) Inventors: Lei Wang, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/967,803

(22) PCT Filed: Jan. 11, 2019

(86) PCT No.: PCT/CN2019/071313
§ 371 (c)(1),
(2) Date: Aug. 6, 2020

(87) PCT Pub. No.: WO2019/154010
PCT Pub. Date: Aug. 15, 2019

(65) Prior Publication Data
US 2021/0045124 A1  Feb. 11, 2021

(30) Foreign Application Priority Data
Feb. 9, 2018  (CN) .......................... 201810135758.4

(51) Int. Cl.
*H04W 72/04*  (2009.01)
*H04W 76/11*  (2018.01)
(Continued)

(52) U.S. Cl.
CPC ....... *H04W 72/0493* (2013.01); *H04L 1/0061* (2013.01); *H04L 5/0094* (2013.01);
(Continued)

(58) Field of Classification Search
CPC ....... H04L 1/0061; H04L 5/00; H04L 5/0053; H04L 5/0094; H04W 72/042;
(Continued)

(56) References Cited

U.S. PATENT DOCUMENTS

2011/0085457 A1  4/2011  Chen et al.
2012/0243496 A1  9/2012  Zhu et al.
(Continued)

FOREIGN PATENT DOCUMENTS

CN  101932114 A  12/2010
CN  107453840 A  12/2017
(Continued)

OTHER PUBLICATIONS

Extended European Search Report dated Feb. 5, 2021 for Application No. EP 19751217.1.
(Continued)

*Primary Examiner* — Eric Nowlin
(74) *Attorney, Agent, or Firm* — Harness, Dickey & Pierce, P.L.C.

(57) ABSTRACT

A resource allocation (RA) method, a terminal, and a network side device are provided. The method includes: receiving, by a terminal within an activated bandwidth part (BWP), downlink control information (DCI) transmitted by a network side device, where the DCI includes an RA field; and determining, by the terminal according to the size of the activated BWP, RA information indicated by the RA field.

16 Claims, 5 Drawing Sheets

(51) Int. Cl.
*H04L 1/00* (2006.01)
*H04L 5/00* (2006.01)
*H04W 72/12* (2009.01)

(52) U.S. Cl.
CPC ..... *H04W 72/042* (2013.01); *H04W 72/0453* (2013.01); *H04W 72/1289* (2013.01); *H04W 76/11* (2018.02)

(58) Field of Classification Search
CPC ......... H04W 72/0453; H04W 72/0493; H04W 72/1289; H04W 76/11
See application file for complete search history.

(56) References Cited

U.S. PATENT DOCUMENTS

| | | | |
|---|---|---|---|
| 2019/0141711 A1 | 5/2019 | Fu et al. | |
| 2019/0222404 A1* | 7/2019 | Ang | H04L 5/0048 |
| 2019/0342907 A1* | 11/2019 | Huang | H04L 5/0053 |
| 2020/0267698 A1* | 8/2020 | Xing | H04L 5/0046 |
| 2021/0045124 A1* | 2/2021 | Wang | H04W 72/0453 |
| 2021/0185684 A1* | 6/2021 | Miao | H04W 72/0406 |

FOREIGN PATENT DOCUMENTS

| | | | | |
|---|---|---|---|---|
| CN | 109803326 A | * | 5/2019 | ........... H04L 5/0092 |
| CN | 109803395 A | * | 5/2019 | ........... H04W 16/10 |
| CN | 109802804 B | * | 8/2021 | ............... H04L 5/00 |
| WO | WO-2019138150 A1 | * | 7/2019 | |

OTHER PUBLICATIONS

Intel Corporation, "Remaining aspects for carrier aggregation and bandwidth parts", Agenda Item 6.3.4, 3GPP TSG RAN WG1 Meeting NR#3, R1-1716327, Sep. 18-21, 2017, Nagoya, Japan.

NTT Docomo, Inc., "Frequency-domain resource allocation", Agenda Item 6.1.3.3.1.1, 3GPP TSG RAN WG1 Meeting #90, R1-1713948, Aug. 21-25, 2017, Prague, Czechia.

Chinese Office Action dated Oct. 30, 2020 for CN Application No. 201810135758.4.

Intel Corporation, "Remaining details on TBS determination and resource allocation", 3GPP TSG RAN WG1 Meeting #91 R1-1720094, Reno, NV, pp. 1-18, Nov. 27-Dec. 1, 2017.

International Search Report for International Application No. PCT/CN2019/071313 dated Feb. 9, 2018.

Written Opinion for International Application No. PCT/CN2019/071313 dated Aug. 20, 2020.

Taiwanese Office Action dated Dec. 9, 2019 for Application No. 108102851.

3GPP TS 26.213, V15.0.0, 3rd Generation Partnership Project, Technical Specification Group Radio Access Network, Evolved Universal Terrestrial Radio Access (E-UTRA), Physical layer procedures (Release 15), Dec. 2017.

Huawei, Hisilicon, "CORESET configuration and search space design", 3GPP TSG RAN WG1 Meeting #91, R1-1719387, Reno, NV, Nov. 27-Dec. 1, 2017.

Catt, "Further details of BWP operation", 3GPP TSG RAN Meeting #91, R1-1720208, Reno, NV, Nov. 27-Dec. 1, 2017.

Chinese Office Action dated Nov. 3, 2021 for Chinese Patent Application No. 201810135758.4.

3GPP TS 36.213 V14.5.0, 3rd Generation Partnership Project; Technical Specification Group Radio Access Network; Evolved Universal Terrestrial Radio Access (E-UTRA); Physical layer procedures (Release 14), Dec. 2017, Valbonne, France.

* cited by examiner

RESOURCE ALLOCATION METHOD, TERMINAL, AND NETWORK SIDE DEVICE

CROSS-REFERENCE TO RELATED APPLICATIONS

The present application is a U.S. national phase application of a PCT Application No. PCT/CN2019/071313 filed on Jan. 11, 2019, which claims a priority to Chinese Patent Application No. 201810135758.4 filed in China, on Feb. 9, 2018, disclosures of which are incorporated in their entireties by reference herein.

TECHNICAL FIELD

The present disclosure relates to the field of telecommunication technology, and in particular to a resource allocation (RA) method, a terminal, and a network side device.

BACKGROUND

The concept of bandwidth part (BWP) has been introduced into a fifth-generation (5G) communication system. In addition, in a 5G communication system, a common search space (CSS) corresponding to a terminal may be transmitted in an initial downlink (DL) BWP configured in a physical broadcast channel (PBCH). To avoid the problem of an indeterminate length of downlink control information (DCI), the length of an RA field in the DCI may be determined by the initial DL BWP. During actual application, an activated BWP of a terminal may be far greater than the initial DL BWP or less than the initial DL BWP. However, the length of the RA field in the DCI is determined by the initial DL BWP, which leads to poor flexibility in resource allocation.

SUMMARY

The present disclosure provides in some embodiments an RA method, a terminal, and a network side device, to resolve the problem that RA has poor flexibility.

The present disclosure provides in some embodiments an RA method, including:

receiving, by a terminal within an activated BWP, DCI transmitted by a network side device, where the DCI includes an RA field; and determining, by the terminal according to the size of the activated BWP, RA information indicated by the RA field.

Optionally, the DCI is transmitted in a CSS within a control resource set 0 (CORESET0), the activated BWP includes the entire CORESET0, and the CORESET0 is a CORESET configured in a PBCH.

Optionally, the DCI includes DCI whose cyclic redundancy check (CRC) code is scrambled with a specific radio network temporary identifier (RNTI).

Optionally, the determining, by the terminal according to the size of the activated BWP, the RA information indicated by the RA field includes:

determining, by the terminal, an RA granularity of the RA field according to the size of the activated BWP, and determining, by the terminal according to the RA granularity, the RA information indicated by the RA field; or performing, by the terminal, a padding operation or a truncation operation on the RA field according to the size of the activated BWP to obtain target information, and determining, by the terminal, the RA information according to the target information.

Optionally, the determining, by the terminal, the RA granularity of the RA field according to the size of the activated BWP includes:

determining, by the terminal, the RA granularity of the RA field according to a comparison result between the size of the activated BWP and the size of an initial BWP; or the performing, by the terminal, the padding operation or the truncation operation on the RA field according to the size of the activated BWP to obtain the target information, and determining, by the terminal, the RA information according to the target information includes:

performing, by the terminal, the padding operation or the truncation operation on the RA field according to a comparison result between the size of the activated BWP and the size of an initial BWP to obtain the target information, and determining, by the terminal, the RA information according to the target information.

Optionally, the determining, by the terminal, the RA granularity of the RA field according to the comparison result between the size of the activated BWP and the size of the initial BWP includes:

in case that the size of the activated BWP is greater than the size of the initial BWP, determining, by the terminal, that the RA granularity of the RA field is N virtual resource blocks (VRBs), where N is an integer obtained by rounding down a quotient, and the quotient is a quotient of dividing the size of the activated BWP by the size of the initial BWP; or in case that the size of the activated BWP is greater than the size of the initial BWP, determining, by the terminal, that the RA granularity of the RA field is M VRBs, where M is an integer obtained by rounding up a quotient, and the quotient is a quotient of dividing the size of the activated BWP by the size of the initial BWP; or in case that the size of the activated BWP is less than or equal to the size of the initial BWP, determining, by the terminal, that the RA granularity of the RA field is one VRB.

Optionally, in case that the RA granularity is M VRBs, the first $\lceil \log_2(N_G^{BWP}(N_G^{BWP}+1)/2) \rceil$ bits in the RA field are valid or the last $\lceil \log_2(N_G^{BWP}(N_G^{BWP}+1)/2) \rceil$ bits in the RA field are valid, where $\lceil \ \rceil$ is rounding up, and $N_G^{BWP}$ is a quantity of RA granularities used for RA in the activated BWP.

Optionally, the performing, by the terminal, the padding operation or the truncation operation on the RA field according to the comparison result between the size of the activated BWP and the size of the initial BWP to obtain the target information, and determining, by the terminal, the RA information according to the target information includes:

in case that the size of the activated BWP is greater than the size of the initial BWP, determining, by the terminal, a target length of the RA field, after the bits of the RA field are obtained through decoding, first padding, by the terminal, $L-L_{RA}$ 0s or 1s before the bits of the RA field to obtain the target information with L bits, and then determining, by the terminal, the RA information according to the target information with the L bits, where L is equal to the target length, and $L_{RA}$ is the length of the RA field; or in case that the size of the activated BWP is greater than the size of the initial BWP, determining, by the terminal, a target length of the RA field, after the bits of the RA field are obtained through decoding, first padding, by the terminal, $L-L_{RA}$ 0s or 1s after the bits of the RA field to obtain the target information with L bits, and then determining, by the terminal, the RA information according to the target information with the L bits, where L is equal to the target length, and $L_{RA}$ is the length of the RA field; or in case that the size of the activated BWP is less than the size of the initial BWP, determining, by the terminal, a target length of the RA field, after the bits of the RA field are obtained through decoding, first performing truncation, by the terminal, on the bits of the RA field to obtain first L bits or last L bits to obtain the target information with the L bits, and then determining, by the terminal, the RA information according to the target information with the L bits, where L is equal to the target length.

Optionally, $L=\lceil \log_2(N_{RB}^{currentBWP}(N_{RB}^{currentBWP}+1)/2) \rceil$, where $\lceil\ \rceil$ is rounding up, and $N_{RB}^{currentBWP}$ is a quantity of resource blocks (RBs) in the activated BWP.

Optionally, the length of the RA field is determined according to the size of the initial BWP of the terminal based on an RA granularity being one VRB.

The present disclosure further provides in some embodiments an RA method, including:

generating, by a network side device, DCI, where the DCI includes an RA field; and transmitting, by the network side device, the DCI to a terminal in an activated BWP of the terminal, so that the terminal determines, according to the size of the activated BWP, RA information indicated by the RA field.

Optionally, the DCI is transmitted in a CSS within a CORESET0, the activated BWP includes the entire CORESET0, and the CORESET0 is a CORESET configured in a PBCH.

Optionally, the DCI includes DCI whose CRC code is scrambled with a specific RNTI.

Optionally, the method further includes:

determining, by the network side device, an RA granularity of the RA field according to the size of the activated BWP; or determining, by the network side device, that an RA granularity of the RA field is one VRB.

Optionally, the determining, by the network side device, the RA granularity of the RA field according to the size of the activated BWP includes:

determining, by the network side device, the RA granularity of the RA field according to a comparison result between the size of the activated BWP and the size of an initial BWP.

Optionally, the determining, by the network side device, the RA granularity of the RA field according to the comparison result between the size of the activated BWP and the size of the initial BWP includes:

in case that the size of the activated BWP is greater than the size of the initial BWP, determining, by the network side device, that the RA granularity of the RA field is N VRBs, where N is an integer obtained by rounding down a quotient, and the quotient is a quotient of dividing the size of the activated BWP by the size of the initial BWP; or in case that the size of the activated BWP is greater than the size of the initial BWP, determining, by the network side device, that the RA granularity of the RA field is M VRBs, where M is an integer obtained by rounding up a quotient, and the quotient is a quotient of dividing the size of the activated BWP by the size of the initial BWP; or in case that the size of the activated BWP is less than or equal to the size of the initial BWP, determining, by the network side device, that the RA granularity of the RA field is one VRB.

Optionally, in case that the RA granularity is M VRBs, the first $\lceil \log_2(N_G^{BWP}(N_G^{BWP}+1)/2) \rceil$ bits in the RA field are valid or the last $\lceil \log_2(N_G^{BWP}(N_G^{BWP}+1)/2) \rceil$ bits in the RA field are valid, where $\lceil\ \rceil$ is rounding up, and $N_G^{BWP}$ is a quantity of RA granularities used for RA in the activated BWP.

Optionally, the length of the RA field is determined according to a size of an initial BWP of the terminal based on an RA granularity being one VRB.

The present disclosure further provides in some embodiments a terminal, including:

a receiving module, configured to receive, within an activated BWP, DCI transmitted by a network side device, where the DCI includes an RA field; and a determination module, configured to determine, according to the size of the activated BWP, RA information indicated by the RA field.

Optionally, the determination module is configured to: determine an RA granularity of the RA field according to the size of the activated BWP, and determine, according to the RA granularity, the RA information indicated by the RA field; or the determination module is configured to: perform a padding operation or a truncation operation on the RA field according to the size of the activated BWP to obtain target information, and determine the RA information according to the target information.

Optionally, the determination module is configured to: determine the RA granularity of the RA field according to a comparison result between the size of the activated BWP and the size of an initial BWP, and determine, according to the RA granularity, the RA information indicated by the RA field; or the determination module is configured to: perform the padding operation or the truncation operation on the RA field according to the size of the activated BWP to obtain the target information, and determine the RA information according to the target information.

The present disclosure further provides in some embodiments a network side device, including:

a generation module, configured to generate DCI, where the DCI includes an RA field; and a transmission module, configured to transmit the DCI to a terminal in an activated BWP of the terminal, so that the terminal determines, according to the size of the activated BWP, RA information indicated by the RA field.

Optionally, the network side device further includes:

a first determination module, configured to determine an RA granularity of the RA field according to the size of the activated BWP; or a second determination module, configured to determine that an RA granularity of the RA field is one VRB.

Optionally, the first determination module is configured to determine the RA granularity of the RA field according to a comparison result between the size of the activated BWP and the size of an initial BWP.

The present disclosure further provides in some embodiments a terminal, including a transceiver, a storage, a processor, and a computer program stored in the storage and configured to be executed by the processor, where the transceiver is configured for receiving, within an activated BWP, DCI transmitted by a network side device, where the DCI includes an RA field; and determining, according to the size of the activated BWP, RA information indicated by the RA field; or the transceiver is configured for receiving, within an activated BWP, DCI transmitted by a network side device, where the DCI includes an RA field; and the processor is configured to read the program in the storage to perform the following process:

determining, according to the size of the activated BWP, RA information indicated by the RA field.

Optionally, the DCI is transmitted in a CSS within a CORESET0, the activated BWP includes the entire CORESET0, and the CORESET0 is a CORESET configured in a PBCH.

Optionally, the DCI includes DCI whose CRC code is scrambled with a specific RNTI.

Optionally, the determining, according to the size of the activated BWP, the RA information indicated by the RA field includes:

determining an RA granularity of the RA field according to the size of the activated BWP, and determining, according to the RA granularity, the RA information indicated by the RA field; or performing a padding operation or a truncation operation on the RA field according to the size of the activated BWP to obtain target information, and determining the RA information according to the target information.

Optionally, the determining the RA granularity of the RA field according to the size of the activated BWP includes:

determining the RA granularity of the RA field according to a comparison result between the size of the activated BWP and the size of an initial BWP; or the performing the padding operation or the truncation operation on the RA field according to the size of the activated BWP to obtain the target information, and determining the RA information according to the target information includes:

performing the padding operation or the truncation operation on the RA field according to a comparison result between the size of the activated BWP and the size of an initial BWP to obtain the target information, and determining the RA information according to the target information.

Optionally, the determining the RA granularity of the RA field according to the comparison result between the size of the activated BWP and the size of the initial BWP includes:

in case that the size of the activated BWP is greater than the size of the initial BWP, determining that the RA granularity of the RA field is N VRBs, where N is an integer obtained by rounding down a quotient, and the quotient is a quotient of dividing the size of the activated BWP by the size of the initial BWP; or in case that the size of the activated BWP is greater than the size of the initial BWP, determining that the RA granularity of the RA field is M VRBs, where M is an integer obtained by rounding up a quotient, and the quotient is a quotient of dividing the size of the activated BWP by the size of the initial BWP; or in case that the size of the activated BWP is less than or equal to the size of the initial BWP, determining that the RA granularity of the RA field is one VRB.

Optionally, in case that the RA granularity is M VRBs, the first $\lceil \log_2(N_G^{BWP}(N_G^{BWP}+1)/2) \rceil$ bits in the RA field are valid or the last $\lceil \log_2(N_G^{BWP}(N_G^{BWP}+1)/2) \rceil$ bits in the RA field are valid, where $\lceil \ \rceil$ is rounding up, and $N_G^{BWP}$ is a quantity of RA granularities used for RA in the activated BWP.

Optionally, the performing the padding operation or the truncation operation on the RA field according to the comparison result between the size of the activated BWP and the size of the initial BWP to obtain the target information, and determining the RA information according to the target information includes:

in case that the size of the activated BWP is greater than the size of the initial BWP, determining a target length of the RA field, after the bits of the RA field are obtained through decoding, first padding $L-L_{RA}$ 0s or 1s before the bits of the RA field to obtain the target information with L bits, and then determining the RA information according to the target information with the L bits, where L is equal to the target length, and $L_{RA}$ is the length of the RA field; or in case that the size of the activated BWP is greater than the size of the initial BWP, determining a target length of the RA field, after the bits of the RA field are obtained through decoding, first padding $L-L_{RA}$ 0s or 1s after the bits of the RA field to obtain the target information with L bits, and then determining the RA information according to the target information with the L bits, where L is equal to the target length, and $L_{RA}$ is the length of the RA field; or in case that the size of the activated BWP is less than the size of the initial BWP, determining, by the terminal, a target length of the RA field, after the bits of the RA field are obtained through decoding, first performing truncation on the bits of the RA field to obtain first L bits or last L bits to obtain the target information with the L bits, and then determining the RA information according to the target information with the L bits, where L is equal to the target length.

Optionally, $L=\lceil \log_2(N_{RB}^{currentBWP}(N_{RB}^{currentBWP}+1)/2) \rceil$, where $\lceil \ \rceil$ is rounding up, and $N_{RB}^{currentBWP}$ is a quantity of RBs in the activated BWP.

Optionally, the length of the RA field is determined according to a size of an initial BWP of the terminal based on an RA granularity being one VRB.

The present disclosure further provides in some embodiments a network side device, including a transceiver, a storage, a processor, and a computer program stored in the storage and configured to be executed by the processor, where the transceiver is configured for: generating DCI, where the DCI includes an RA field; and transmitting the DCI to a terminal in an activated BWP of the terminal, so that the terminal determines, according to the size of the activated BWP, RA information indicated by the RA field; or the processor is configured to read the program in the storage to perform the following process:

generating DCI, where the DCI includes an RA field; and the transceiver is configured for transmitting the DCI to a terminal in an activated BWP of the terminal, so that the terminal determines, according to the size of the activated BWP, RA information indicated by the RA field.

Optionally, the DCI is transmitted in a CSS within a CORESET0, the activated BWP includes the entire CORESET0, and the CORESET0 is a CORESET configured in a PBCH.

Optionally, the DCI includes DCI whose CRC code is scrambled with a specific RNTI.

Optionally, the processor or the transceiver is further configured for:

determining an RA granularity of the RA field according to the size of the activated BWP; or determining that an RA granularity of the RA field is one VRB.

Optionally, the determining the RA granularity of the RA field according to the size of the activated BWP includes:

determining the RA granularity of the RA field according to a comparison result between the size of the activated BWP and the size of an initial BWP.

Optionally, the determining the RA granularity of the RA field according to the comparison result between the size of the activated BWP and the size of the initial BWP includes:

in case that the size of the activated BWP is greater than the size of the initial BWP, determining that the RA granularity of the RA field is N VRBs, where N is an integer obtained by rounding down a quotient, and the quotient is a quotient of dividing the size of the activated BWP by the size of the initial BWP; or in case that the size of the activated BWP is greater than the size of the initial BWP, determining that the RA granularity of the RA field is M VRBs, where M is an integer obtained by rounding up a quotient, and the quotient is a quotient of dividing the size of the activated BWP by the size of the initial BWP; or in case that the size of the activated BWP is less than or equal to the size of the initial BWP, determining that the RA granularity of the RA field is one VRB.

Optionally, in case that the RA granularity is M VRBs, the first $\lceil \log_2(N_G^{BWP}(N_G^{BWP}+1)/2) \rceil$ bits in the RA field are valid or the last $\lceil \log_2(N_G^{BWP}(N_G^{BWP}+1)/2) \rceil$ bits in the RA field are valid, where $\lceil \ \rceil$ is rounding up, and $N_G^{BWP}$ is a quantity of RA granularities used for RA in the activated BWP.

Optionally, the length of the RA field is determined according to a size of an initial BWP of the terminal based on an RA granularity being one VRB.

The present disclosure further provides in some embodiments a computer-readable storage medium storing therein a computer program, where the program is configured to be executed by a processor to implement the steps in the RA method on a terminal side provided in some embodiments of the present disclosure or implement the steps in the RA method on a network side device side provided in some embodiments of the present disclosure.

In this way, in the embodiments of the present disclosure, a terminal receives, within an activated BWP, DCI transmitted by a network side device, where the DCI includes an RA field; and the terminal determines, according to the size of the activated BWP, RA information indicated by the RA field. User equipment (UE) determines, according to the size of the activated BWP, the RA information indicated by the RA field, so that the flexibility of RA can be improved.

DETAILED DESCRIPTION

To make the technical problems, the technical solutions, and advantages of the present disclosure clearer, detailed descriptions are provided below with reference to the accompanying drawings and specific embodiments.

Figure 1:
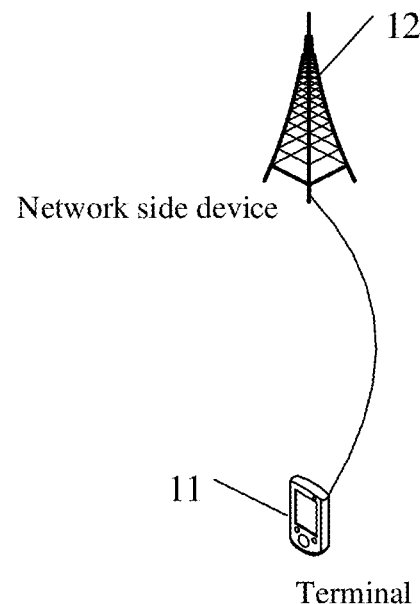
FIG. 1 is a schematic diagram of a network structure to which embodiments of the present disclosure are applicable.

Referring to FIG. 1, FIG. 1 is a schematic diagram of a network structure to which embodiments of the present disclosure are applicable. As shown in FIG. 1, the network structure includes a terminal 11 and a network side device 12. The terminal 11 may be user equipment (UE) or other terminal device, e.g., a terminal side device such as a mobile phone, a tablet personal computer, a laptop computer, a personal digital assistant (PDA), a mobile Internet device (MID) or a wearable device. It needs to be noted that the specific type of the terminal 11 is not limited in the embodiments of the present disclosure. The network side device 12 may be a base station, for example, a macro base station, a long term evolution (LTE) evolved node B (eNB) or a 5G New Radio (NR) node B (NB). The network side device 12 may be a small base station, for example, a low power node (LPN), a pico base station or a femto base station. Alternatively, the network side device 12 may be an access point (AP). The base station may be a network node formed by a central unit (CU) and a plurality of transmission reception points (TRPs) managed and controlled by the CU. It needs to be noted that the specific type of the network side device 12 is not limited in the embodiments of the present disclosure.

Figure 2:
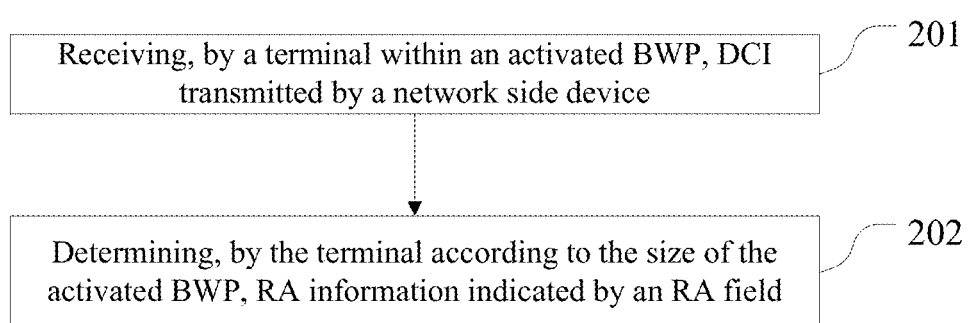
FIG. 2 is a flowchart of an RA method according to an embodiment of the present disclosure.

Referring to FIG. 2, FIG. 2 is a flowchart of an RA method according to an embodiment of the present disclosure. As shown in FIG. 2, the method includes the following steps.

A step 201 includes: receiving, by a terminal within an activated BWP, DCI transmitted by a network side device, where the DCI includes an RA field.

A step 202 includes: determining, by the terminal according to the size of the activated BWP, RA information indicated by the RA field.

The activated BWP may be a BWP activated for the terminal. The activated BWP may be referred to as a current BWP of the terminal.

The DCI may be DCI used for scheduling the terminal for data transmission. The RA field may be used for indicating a resource allocated by the network side device for data transmission, so that the data transmission performed by the terminal in the activated BWP occupies the resource indicated by the RA field.

The size of the activated BWP may also be referred to as the actual size of the activated BWP, for example, a quantity of RBs included in the activated BWP, or a quantity of RA granularities used for RA in the activated BWP. Here, an RA granularity used for RA may be an RA granularity available for RA.

The determining, by the terminal according to the size of the activated BWP, the RA information indicated by the RA field may include: parsing the RA field according to the size of the activated BWP, to determine the RA information indicated by the information bits of the RA field. For example, the RA information indicates that the data transmission occupies the $0^{th}$ to $10^{th}$ VRBs or the RA information indicates that the data transmission occupies the $0^{th}$ to $20^{th}$ VRBs, or the like.

Considering that the length of the RA field in the DCI may be determined by an initial DL BWP, and the size of the activated BWP may be different from the size of the initial DL BWP, for example, the activated BWP of the terminal may be far greater than the initial DL BWP or is less than the initial DL BWP, by determining the RA information indicated by the RA field according to the size of the activated BWP, the flexibility of RA can be improved, and a change in the length of the RA field can be avoided, thereby reducing the complexity of RA.

Optionally, the DCI is transmitted in a CSS within a CORESET0, the activated BWP includes the entire CORESET0, and the CORESET0 is a CORESET configured in a PBCH.

That the activated BWP includes the entire CORESET0 may mean that the CORESET0 is completely located in the activated BWP. In the implementation, because the activated BWP includes the entire CORESET0, UE only needs to search in the CSS of the CORESET0, thereby reducing the power consumption of the UE.

Optionally, the DCI includes DCI whose CRC code is scrambled with a specific RNTI; and/or the length of the RA field is determined according to a size of an initial BWP of the terminal based on an RA granularity being one VRB.

The specific RNTI includes, but is not limited to, a unicast scheduling-related RNTI such as a cell RNTI (C-RNTI) or a temporary C-RNTI (TC-RNTI) or a configured scheduling RNTI (CS-RNTI) or a semi-persistent channel state information RNTI (SP-CSI-RNTI). Optionally, the DCI may be fallback DCI transmitted in the CSS within the CORESET0. The DCI may be fallback DCI for scheduling unicast data.

The initial BWP may be an initial DL BWP. In the implementation, it may be implemented that, although the length of the RA field is determined according to a size of an initial BWP of the terminal based on an RA granularity being one VRB, the terminal determines, when parsing the RA field, the RA information indicated by the RA field according to the size of the activated BWP, so that the flexibility of RA can be improved.

In an optional implementation, the determining, by the terminal according to the size of the activated BWP, the RA information indicated by the RA field includes:

determining, by the terminal, an RA granularity of the RA field according to the size of the activated BWP, and determining, by the terminal according to the RA granularity, the RA information indicated by the RA field.

The RA granularity of the RA field may be an RA granularity for parsing the RA field, for example, one VRB, two VRBs or the like. The determining, according to the RA granularity, the RA information indicated by the RA field may include: parsing the RA field based on the RA granularity to determine the RA information.

It needs to be noted that after the RA granularity of the RA field is determined, the RA information indicated by the RA field is determinate. For example, if the RA granularity is two VRBs, and the information bits of the RA field represents the $0^{th}$ to $5^{th}$ resource units, it is determined that each resource unit is two VRBs, that is, the RA information indicated by the RA field is the $0^{th}$ to $10^{th}$ VRBs. In another example, if the RA granularity is two VRBs, and the RA field includes a bitmap, each bit in the bitmap represents two VRBs.

In addition, the determining, by the terminal, the RA granularity of the RA field according to the size of the activated BWP may include determining the RA granularity according to the size of the activated BWP and the length of the RA field. For example, the terminal may determine the RA granularity according to a preconfigured mapping relationship between the size of the activated BWP, the length of the RA field and the RA granularity. Alternatively, the determining, by the terminal, the RA granularity of the RA field according to the size of the activated BWP may include determining, by the terminal, the RA granularity according to a pre-acquired mapping relationship between the size of the activated BWP and the RA granularity.

In the implementation, the RA granularity of the RA field is determined according to the size of the activated BWP, so that the flexibility of RA is further improved, and it is not necessary to adjust the length of the RA field according to the size of the activated BWP, thereby reducing implementation costs.

Optionally, the determining, by the terminal, the RA granularity of the RA field according to the size of the activated BWP includes:

determining, by the terminal, the RA granularity of the RA field according to a comparison result between the size of the activated BWP and the size of an initial BWP.

Since the length of the RA field in the DCI may be determined by the initial BWP, in the implementation, by determining the RA granularity according to the comparison result, it may be implemented that different RA information are indicated according to different activated BWPs while the length of the RA field is kept unchanged, thereby further improving the flexibility of RA. In addition, the length of the RA field may further be prevented from being changed, thereby reducing the complexity of RA.

Optionally, the determining, by the terminal, the RA granularity of the RA field according to the comparison result between the size of the activated BWP and the size of the initial BWP includes:

if the size of the activated BWP is greater than the size of the initial BWP, determining, by the terminal, that the RA granularity of the RA field is N VRBs, where N is an integer obtained by rounding down a quotient, and the quotient is a quotient of dividing the size of the activated BWP by the size of the initial BWP; or if the size of the activated BWP is greater than the size of the initial BWP, determining, by the terminal, that the RA granularity of the RA field is M VRBs, where M is an integer obtained by rounding up a quotient, and the quotient is a quotient of dividing the size of the activated BWP by the size of the initial BWP; or if the size of the activated BWP is less than or equal to the size of the initial BWP, determining, by the terminal, that the RA granularity of the RA field is one VRB.

The size of the activated BWP may be a quantity of RBs included in the activated BWP. The size of the initial BWP may be a quantity of RBs included in the initial BWP. N may be determined according to G=floor ($BWP_{current}/BWP_{initial}$), where the value of G is N, floor represents rounding down, $BWP_{current}$ represents the quantity of RBs included in the activated BWP, and $BWP_{initial}$ represents the quantity of RBs included in the initial BWP. Certainly, in the embodiments of the present disclosure, the size of the BWP is not limited to the quantity of RBs included in the BWP. For example, the size of the BWP may alternatively be a quantity in units of other resource granularities.

Figure 3:
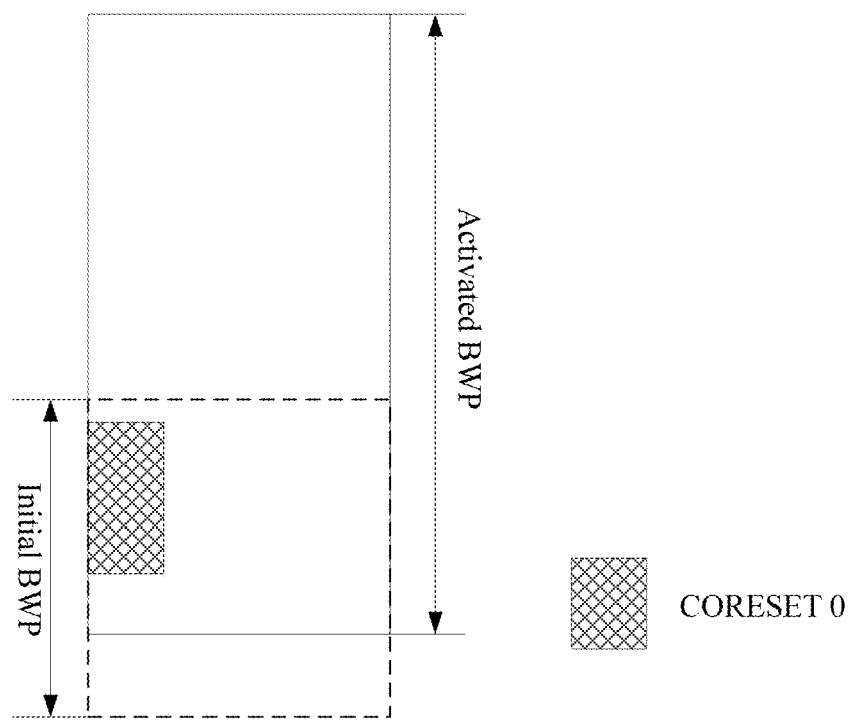
FIG. 3 is a schematic diagram of an activated BWP, an initial BWP, and a CORESET0 according to an embodiment of the present disclosure.

For example, as shown in FIG. 3, the CORESET0 configured in the PBCH is completely located in the activated BWP, and the network side device transmits, in the CSS in the CORESET0, the DCI for scheduling unicast data transmission. In this example, the CRC code of the DCI is scrambled with the C-RNTI. Certainly, scrambling with another type of RNTI such as a TC-RNTI, a CS-RNTI or an SP-CSI-RNTI is not excluded.

Assuming that the activated BWP is greater than the initial BWP, the RA granularity is determined by using the formula G=floor($BWP_{current}/BWP_{initial}$), where floor represents rounding down, $BWP_{current}$ represents the quantity of RBs included in the activated BWP, and $BWP_{initial}$ represents the quantity of RBs included in the initial BWP. In this example, assuming that an initial DL BWP includes 25 physical resource blocks (PRBs), and the activated BWP includes 50 PRBs, then G=floor(50/25)=2. After the terminal detects and receives the RA field in the DCI, the terminal interprets it according to a RA granularity of two VRBs. For example, the RA field (which may also be referred to as a resource indication field) indicates that the data transmission of the terminal in the activated BWP occupies the $0^{th}$ to $5^{th}$ resource units. Correspondingly, the occupied resource positions are the 0'h to $10^{th}$ VRBs. When the activated BWP is less than the initial BWP, the RA granularity is one VRB.

Similarly, M may also be determined by using the formula G=ceil ($BWP_{current}/BWP_{initial}$), where the value of G is M, ceil represents rounding up, $BWP_{current}$ represents the quantity of RBs included in the activated BWP, and $BWP_{initial}$ represents the quantity of RBs included in the initial BWP.

For example, the CORESET0 configured in the PBCH is completely located in the activated BWP, and the network side device transmits, in the CSS in the CORESET0, the DCI for scheduling unicast data transmission. In this example, the CRC code of the DCI is scrambled with C-RNTI. Certainly, scrambling with another type of RNTI such as a TC-RNTI, a CS-RNTI or an SP-CSI-RNTI is not excluded.

Assuming that the activated BWP is greater than the initial BWP, the RA granularity is determined by using the formula G=ceil($BWP_{current}/BWP_{initial}$), where ceil represents rounding up, $BWP_{current}$ represents the quantity of RBs included in the activated BWP, and $BWP_{initial}$ represents the quantity of RBs included in the initial BWP. In this example, assuming that the initial BWP includes 25 PRBs, and the activated BWP includes 50 PRBs, then G=floor(50/25)=2. After the terminal detects and receives the RA field in the DCI, the terminal interprets it according to a RA granularity of two VRBs. For example, the RA field (which may also be referred to as a resource indication field) indicates that the data transmission of the terminal in the activated BWP occupies the $0^{th}$ to $5^{th}$ resource units. Correspondingly, the occupied resource positions are the $0^{th}$ to $10^{th}$ VRBs. When the activated BWP is less than the initial BWP, the RA granularity is one VRB.

In the implementation, if the size of the activated BWP is greater than the size of the initial BWP, it may be determined that the RA granularity of the RA field is N or M VRBs, or if the size of the activated BWP is less than or equal to the size of the initial BWP, it may be directly determined that the RA granularity of the RA field is one VRB, so that the flexibility of RA can further be improved.

Optionally, if the RA granularity is M VRBs, the first $\lceil \log_2(N_G^{BWP}(N_G^{BWP}+1)/2) \rceil$ bits in the RA field are valid or the last $\lceil \log_2(N_G^{BWP}(N_G^{BWP}+1)/2) \rceil$ bits in the RA field are valid, where $\lceil \ \rceil$ is rounding up, and $N_G^{BWP}$ is a quantity of RA granularities used for RA in the activated BWP.

The quantity of RA granularities used for RA in the activated BWP may be the quantity of RA granularities (M VRBs) available for RA in the activated BWP.

In this way, if the RA granularity is M VRBs, when determining the RA information, the terminal only uses the first $\lceil \log_2(N_G^{BWP}(N_G^{BWP}+1)/2) \rceil$ bits or last $\lceil \log_2(N_G^{BWP}(N_G^{BWP}+1)/2) \rceil$ bits in the RA field, so that the flexibility and accuracy of RA are further improved. In addition, during RA, the network side device only uses the first $\lceil \log_2(N_G^{BWP}(N_G^{BWP}+1)/2) \rceil$ bits or last $\lceil \log_2(N_G^{BWP}(N_G^{BWP}+1)/2) \rceil$ bits in the RA field to perform resource allocation.

In an optional implementation, the determining, by the terminal according to the size of the activated BWP, the RA information indicated by the RA field includes:

performing, by the terminal, a padding operation or a truncation operation on the RA field according to the size of the activated BWP to obtain target information, and determining the RA information according to the target information.

The determining the RA information according to the target information may refer to determining the RA information indicated by the target information. In addition, in the implementation, the RA information indicated by the target information may be determined based on an RA granularity being one RB.

In the implementation, the padding operation or the truncation operation may be performed on the RA field according to the size of the activated BWP, and the RA information is determined according to the obtained information, so that the flexibility of RA can further be improved.

In addition, in the implementation, according to a pre-acquired mapping relationship between the size of the BWP and a padding operation or truncation operation, it may be determined to perform the padding operation or the truncation operation, and further the length of the padding operation or the truncation operation may be determined. Optionally, the performing, by the terminal, the padding operation or the truncation operation on the RA field according to the size of the activated BWP to obtain the target information, and determining the RA information according to the target information includes:

performing, by the terminal, the padding operation or the truncation operation on the RA field according to a comparison result between the size of the activated BWP and the size of an initial BWP to obtain the target information, and determining the RA information according to the target information.

Since the length of the RA field in the DCI may be determined by the initial BWP, in the implementation, by performing the padding operation or the truncation operation on the RA field according to a comparison result and further determining the RA information, it may be implemented that different RA information are indicated according to different activated BWPs while the length of the RA field is kept unchanged, thereby further improving the flexibility of RA. In addition, the length of the RA field may further be prevented from being changed, thereby reducing the complexity of RA.

Optionally, the performing, by the terminal, the padding operation or the truncation operation on the RA field according to the comparison result between the size of the activated BWP and the size of the initial BWP to obtain the target information, and determining the RA information according to the target information includes:

if the size of the activated BWP is greater than the size of the initial BWP, determining, by the terminal, a target length of the RA field, after the bits of the RA field are obtained through decoding, first padding L–$L_{RA}$ 0s or 1s, by the terminal, before the bits of the RA field to obtain the target information with L bits, and then determining, by the terminal, the RA information according to the target information with the L bits, where L is equal to the target length, and $L_{RA}$ is the length of the RA field; or if the size of the activated BWP is greater than the size of the initial BWP, determining, by the terminal, a target length of the RA field, after the bits of the RA field are obtained through decoding, first padding L–$L_{RA}$ 0s or 1s, by the terminal, after the bits of the RA field to obtain the target information with L bits, and then determining, by the terminal, the RA information according to the target information with the L bits, where L is equal to the target length, and $L_{RA}$ is the length of the RA field; or if the size of the activated BWP is less than the size of the initial BWP, determining, by the terminal, a target length of the RA field, after the bits of the RA field are obtained through decoding, first performing, by the terminal, truncation on the bits of the RA field to obtain first L bits or last L bits to obtain the target information with the L bits, and then determining, by the terminal, the RA information according to the target information with the L bits, where L is equal to the target length.

In this implementation, it may be implemented that padding is performed on the RA field if the size of the activated BWP is greater than the size of the initial BWP, and truncation is performed if the size of the activated BWP is less than the size of the initial BWP, therefore it may be implemented that RA is performed for the activated BWPs with different sizes while the length of the RA field in the DCI transmitted by the network side device remains unchanged, so that the flexibility of RA is improved, and the length of the RA field is prevented from being changed, thereby reducing the complexity of RA.

Optionally, $L=\lceil \log_2(N_{RB}^{currentBWP}(N_{RB}^{currentBWP}+1)/2) \rceil$, where $\lceil\ \rceil$ is rounding up, and $N_{RB}^{currentBWP}$ is a quantity of RBs in the activated BWP.

For example, the CORESET0 configured in the PBCH is completely located in the activated BWP, and a base station transmits, in the CSS in the CORESET0, the DCI for scheduling unicast data transmission. In this example, the CRC code of the DCI is scrambled with the C-RNTI. Certainly, scrambling with another type of RNTI such as a TC-RNTI, a CS-RNTI or an SP-CSI-RNTI is not excluded. It is assumed that the initial BWP includes 25 PRBs, and the activated BWP includes 50 PRBs.

The terminal detects and receives the DCI. Having received the DCI successfully, the terminal first performs the padding operation or the truncation operation on the RA field in the DCI according to the size of the current BWP. When the activated BWP is greater than the initial BWP, the padding operation needs to be performed on the RA field. A target length $L=\lceil \log_2(N_{RB}^{currentBWP}(N_{RB}^{currentBWP}+1)/2) \rceil$ of the padding operation is determined, where $N_{RB}^{currentBWP}$ is a quantity of RBs included in the currently activated BWP. In the embodiment, L=11 bits, and $L_{RA}$=9 bits. That is, 2 bits need to be padded for the RA field in the DCI. $L_{RA}$ is the length of an RA indication field carried in the DCI. The information bits 0 or 1 of the 2 bits may be added before or after the 9-bit information. The terminal determines the RA of data transmission in the activated BWP according to the new 11-bit information obtained from the padding.

In another example, the CORESET0 configured in the PBCH is completely located in the activated BWP, and a base station transmits, in the CSS in the CORESET0, the DCI for scheduling unicast data transmission. In this example, the CRC code of the DCI is scrambled with the C-RNTI. Certainly, scrambling with another type of RNTI such as a TC-RNTI, a CS-RNTI or an SP-CSI-RNTI is not excluded. It is assumed that the initial BWP includes 50 PRBs, and the activated BWP includes 25 PRBs.

The terminal detects and receives the DCI. Having received the DCI successfully, the terminal first performs the padding operation or the truncation operation on the RA field in the DCI according to the size of the current BWP. When the activated BWP is less than the initial BWP, the truncation operation needs to be performed on the RA field.

A target length $L=\lceil \log_2(N_{RB}^{currentBWP}(N_{RB}^{currentBWP}+1)/2) \rceil$ of the truncation is determined, where $N_{RB}^{current\ BWP}$ is a quantity of RBs included in the currently activated BWP. In this example, L=9 bits, and $L_{RA}$=11 bits. $L_{RA}$ is the length of an RA indication field carried in the DCI. The network side device uses the first L bits or the last L bits in the $L_{RA}$-bit information carried in the DCI to indicate RA for data. After detecting and receiving the DCI, the terminal performs a truncation on the 11 bits to obtain the first 9 bits or last 9 bits, to determine the RA for a data channel in the activated BWP.

In the implementation, the target length may be determined according to the foregoing formula. The formula is applicable to activated BWPs of different sizes, to improve the compatibility of the RA method provided in the embodiments of the present disclosure. Certainly, in the embodiments of the present disclosure, it is not limited that the target length is determined by using the foregoing formula. For example, the target length may be determined according to a preset mapping relationship between the size of a BWP and the target length.

It needs to be noted that in the embodiments of the present disclosure, the terminal and the network side device have a consensus with respect to the RA field and the RA granularity. When configuring the RA field in the DCI, the network side device also performs configuration according to the RA granularity.

Figure 4:
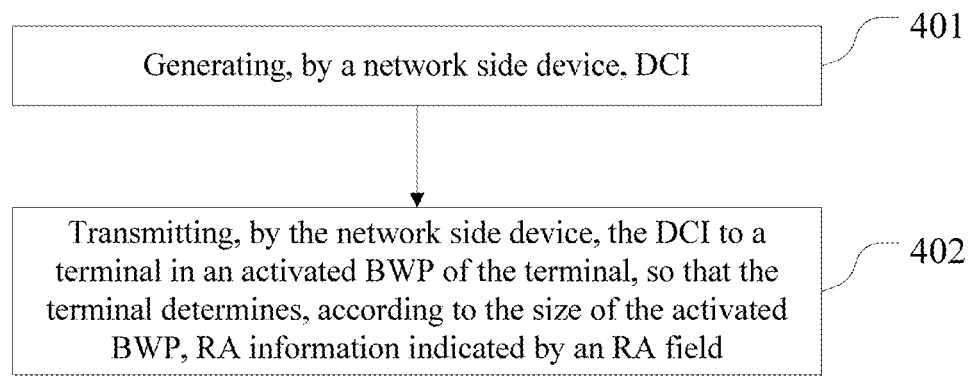
FIG. 4 is a flowchart of another RA method according to an embodiment of the present disclosure.

Referring to FIG. 4, FIG. 4 is a flowchart of another RA method according to an embodiment of the present disclosure. As shown in FIG. 4, the method includes the following steps.

A step 401 includes: generating, by a network side device, DCI, where the DCI includes an RA field.

A step 402 includes: transmitting, by the network side device, the DCI to a terminal in an activated BWP of the terminal, so that the terminal determines, according to the size of the activated BWP, RA information indicated by the RA field.

Optionally, the DCI is transmitted in a CSS within a CORESET0, the activated BWP includes the entire CORESET0, and the CORESET0 is a CORESET configured in a PBCH.

Optionally, the method further includes:

determining, by the network side device, an RA granularity of the RA field according to the size of the activated BWP; or determining, by the network side device, that an RA granularity of the RA field is one VRB.

It needs to be noted that the network side device determines the RA granularity. In this case, the RA field included in the DCI is configured according to the determined RA granularity.

Optionally, the determining, by the network side device, the RA granularity of the RA field according to the size of the activated BWP includes:

determining, by the network side device, the RA granularity of the RA field according to a comparison result between the size of the activated BWP and the size of an initial BWP.

Optionally, the determining, by the network side device, the RA granularity of the RA field according to the comparison result between the size of the activated BWP and the size of the initial BWP includes:

if the size of the activated BWP is greater than the size of the initial BWP, determining, by the network side device, that the RA granularity of the RA field is N VRBs, where N is an integer obtained by rounding down a quotient, and the quotient is a quotient of dividing the size of the activated BWP by the size of the initial BWP; or if the size of the activated BWP is greater than the size of the initial BWP, determining, by the network side device, that the RA granularity of the RA field is M VRBs, where M is an integer obtained by rounding up a quotient, and the quotient is a quotient of dividing the size of the activated BWP by the size of the initial BWP; or if the size of the activated BWP is less than or equal to the size of the initial BWP, determining, by the network side device, that the RA granularity of the RA field is one VRB.

Optionally, if the RA granularity is M VRBs, the first $\lceil\log_2(N_G^{BWP}(N_G^{BWP}+1)/2)\rceil$ bits in the RA field are valid or the last $\lceil\log_2(N_G^{BWP}(N_G^{BWP}+1)/2)\rceil$ bits in the RA field are valid, where $\lceil\ \rceil$ is rounding up, and $N_G^{BWP}$ is a quantity of RA granularities used for RA in the activated BWP.

Optionally, the DCI includes DCI whose CRC code is scrambled with a specific RNTI; and/or the length of the RA field is determined according to a size of an initial BWP of the terminal based on an RA granularity being one VRB.

It needs to be noted that, as an implementation in a network side device corresponding to the embodiment shown in FIG. 2, reference may be made to the related description of the embodiment shown in FIG. 2 for a specific implementation of this embodiment. To avoid repetition, details are not described in this embodiment again, and the same beneficial effects can be achieved.

Figure 5:
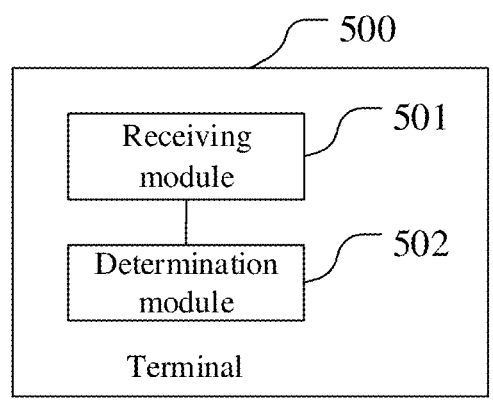
FIG. 5 is a structural diagram of a terminal according to an embodiment of the present disclosure.

Referring to FIG. 5, FIG. 5 is a structural diagram of a terminal according to an embodiment of the present disclosure. As shown in FIG. 5, a terminal 500 includes:

a receiving module 501, configured to receive, within an activated BWP, DCI transmitted by a network side device, where the DCI includes an RA field; and a determination module 502, configured to determine, according to the size of the activated BWP, RA information indicated by the RA field.

Optionally, the DCI is transmitted in a CSS within a CORESET0, the activated BWP includes the entire CORESET0, and the CORESET0 is a CORESET configured in a PBCH.

Optionally, the determination module 502 is configured to: determine an RA granularity of the RA field according to the size of the activated BWP, and determine, according to the RA granularity, the RA information indicated by the RA field; or the determination module 502 is configured to: perform a padding operation or a truncation operation on the RA field according to the size of the activated BWP to obtain target information, and determine the RA information according to the target information.

Optionally, the determination module 502 is configured to: determine the RA granularity of the RA field according to a comparison result between the size of the activated BWP and the size of an initial BWP, and determine, according to the RA granularity, the RA information indicated by the RA field; or the determination module 502 is configured to: perform the padding operation or the truncation operation on the RA field according to the size of the activated BWP to obtain the target information, and determine the RA information according to the target information.

Optionally, the determination module 502 is configured to: if the size of the activated BWP is greater than the size of the initial BWP, determine that the RA granularity of the RA field is N VRBs, and determine, according to the RA granularity, the RA information indicated by the RA field, where N is an integer obtained by rounding down a quotient, and the quotient is a quotient of dividing the size of the activated BWP by the size of the initial BWP; or the determination module 502 is configured to: if the size of the activated BWP is greater than the size of the initial BWP, determine that the RA granularity of the RA field is M VRBs, and determine, according to the RA granularity, the RA information indicated by the RA field, where M is an integer obtained by rounding up a quotient, and the quotient is a quotient of dividing the size of the activated BWP by the size of the initial BWP; or the determination module 502 is configured to: if the size of the activated BWP is less than or equal to the size of the initial BWP, determine that the RA granularity of the RA field is one VRB, and determine, according to the RA granularity, the RA information indicated by the RA field.

Optionally, if the RA granularity is M VRBs, the first $\lceil\log_2(N_G^{BWP}(N_G^{BWP}+1)/2)\rceil$ bits in the RA field are valid or the last $\lceil\log_2(N_G^{BWP}(N_G^{BWP}+1)/2)\rceil$ bits in the RA field are valid, where $\lceil\ \rceil$ is rounding up, and $N_G^{BWP}$ is a quantity of RA granularities used for RA in the activated BWP.

Optionally, the determination module 502 is configured to: if the size of the activated BWP is greater than the size of the initial BWP, determine a target length of the RA field, after the bits of the RA field are obtained through decoding, first pad $L-L_{RA}$ 0s or 1s before the bits of the RA field to obtain the target information with L bits, and then determine the RA information according to the target information with the L bits, where L is equal to the target length, and $L_{RA}$ is the length of the RA field;

the determination module 502 is configured to: if the size of the activated BWP is greater than the size of the initial BWP, determine a target length of the RA field, after the bits of the RA field are obtained through decoding, first pad $L-L_{RA}$ 0s or 1s after the bits of the RA field to obtain the target information with L bits, and then determine the RA information according to the target information with the L bits, where L is equal to the target length, and $L_{RA}$ is the length of the RA field; or the determination module 502 is configured to: if the size of the activated BWP is less than the size of the initial BWP, determine a target length of the RA field, after the bits of the RA field are obtained through decoding, first perform truncation on the bits of the RA field to obtain first L bits or last L bits to obtain the target information with the L bits, and then determine the RA information according to the target information with the L bits, where L is equal to the target length.

Optionally, $L=\lceil\log_2(N_{RB}^{currentBWP}(N_{RB}^{currentBWP}+1)/2)\rceil$, where $\lceil\ \rceil$ is rounding up, and $N_{RB}^{currentBWP}$ is a quantity of RBs in the activated BWP.

Optionally, the DCI includes DCI whose CRC code is scrambled with a specific RNTI; and/or the length of the RA field is determined according to a size of an initial BWP of the terminal based on an RA granularity being one VRB.

It needs to be noted that the terminal 500 in this embodiment may be the terminal in any implementation in the method embodiments of the present disclosure. Any implementation of the terminal in the method embodiments of the present disclosure may be achieved by the terminal 500 in this embodiment, and the same beneficial effects can be achieved. Details are not described herein again.

Figure 6:
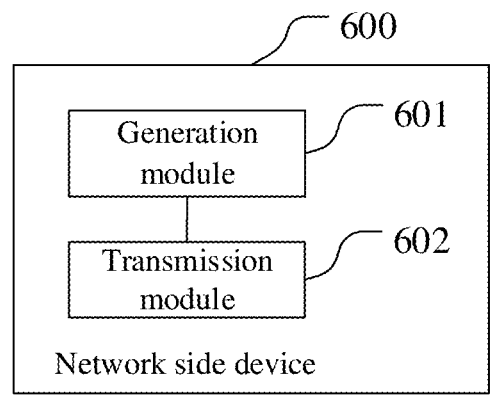
FIG. 6 is a structural diagram of a network side device according to an embodiment of the present disclosure.

Referring to FIG. 6, FIG. 6 is a structural diagram of a network side device according to an embodiment of the present disclosure. As shown in FIG. 6, a network side device 600 includes:

a generation module 601, configured to generate DCI, where the DCI includes an RA field; and a transmission module 602, configured to transmit the DCI to a terminal in an activated BWP of the terminal, so that the terminal determines, according to the size of the activated BWP, RA information indicated by the RA field.

Optionally, the DCI is transmitted in a CSS within a CORESET0, the activated BWP includes the entire CORESET0, and the CORESET0 is a CORESET configured in a PBCH.

Figure 7:
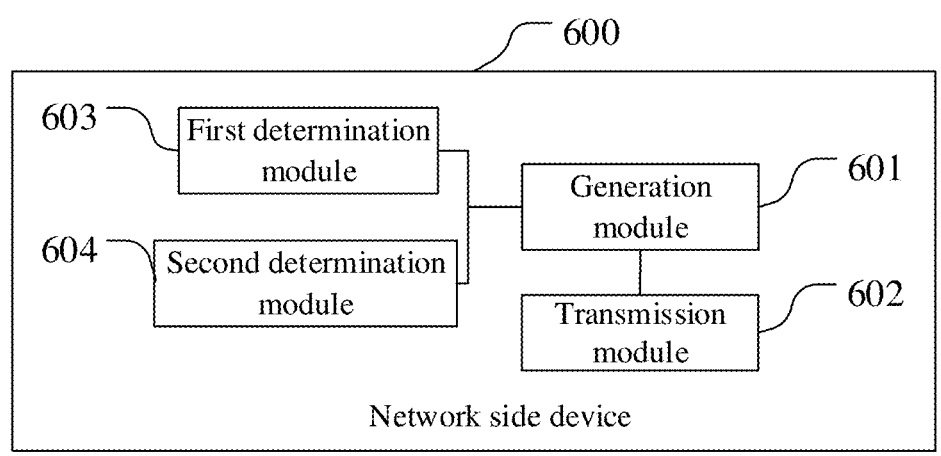
FIG. 7 is another structural diagram of a network side device according to an embodiment of the present disclosure.

Optionally, as shown in FIG. 7, the network side device 600 further includes:

a first determination module 603, configured to determine an RA granularity of the RA field according to the size of the activated BWP; or a second determination module 604, configured to determine that an RA granularity of the RA field is one VRB.

Optionally, the first determination module 603 is configured to determine the RA granularity of the RA field according to a comparison result between the size of the activated BWP and the size of an initial BWP.

Optionally, the first determination module 603 is configured to: if the size of the activated BWP is greater than the size of the initial BWP, determine that the RA granularity of the RA field is N VRBs, where N is an integer obtained by rounding down a quotient, and the quotient is a quotient of dividing the size of the activated BWP by the size of the initial BWP; or the first determination module 603 is configured to: if the size of the activated BWP is greater than the size of the initial BWP, determine that the RA granularity of the RA field is M VRBs, where M is an integer obtained by rounding up a quotient, and the quotient is a quotient of dividing the size of the activated BWP by the size of the initial BWP.

Optionally, the first determination module 603 is configured to: if the size of the activated BWP is less than or equal to the size of the initial BWP, determine that the RA granularity of the RA field is one VRB.

Optionally, if the RA granularity is M VRBs, the first $\lceil \log_2(N_G^{BWP}(N_G^{BWP}+1)/2) \rceil$ bits in the RA field are valid or the last $\lceil \log_2(N_G^{BWP}(N_G^{BWP}+1)/2) \rceil$ bits in the RA field are valid, where $\lceil \ \rceil$ is rounding up, and $N_G^{BWP}$ is a quantity of RA granularities used for RA in the activated BWP.

Optionally, the DCI includes DCI whose CRC code is scrambled with a specific RNTI; and/or the length of the RA field is determined according to a size of an initial BWP of the terminal based on an RA granularity being one VRB.

It needs to be noted that the network side device 600 in this embodiment may be the network side device in any implementation in the method embodiments of the present disclosure. Any implementation of the network side device in the method embodiments of the present disclosure may be achieved by the network side device 600 in this embodiment, and the same beneficial effects can be achieved. Details are not described herein again.

Figure 8:
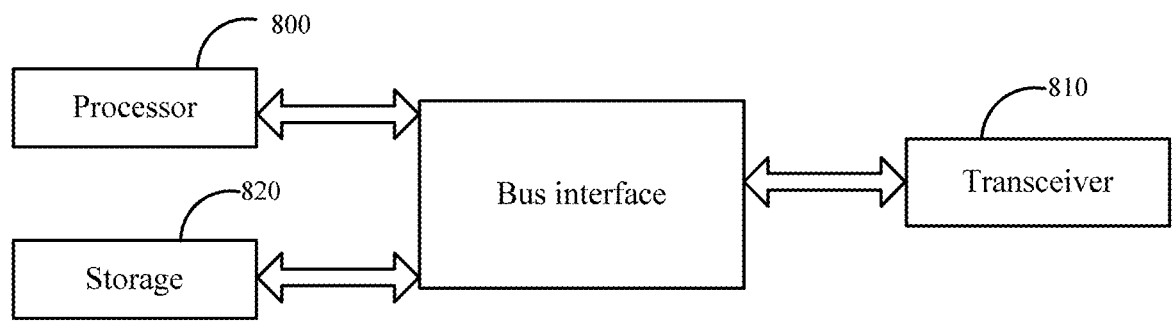
FIG. 8 is another structural diagram of a terminal according to an embodiment of the present disclosure.

Referring to FIG. 8, FIG. 8 is another structural diagram of a terminal according to an embodiment of the present disclosure. As shown in FIG. 8, the terminal includes a transceiver 810, a storage 820, a processor 800, and a computer program stored in the storage 820 and configured to be executed by the processor, where the transceiver 810 is configured for: receiving, within an activated BWP, DCI transmitted by a network side device, where the DCI includes an RA field; and determining, according to the size of the activated BWP, RA information indicated by the RA field;

or the transceiver 810 is configured for receiving, within an activated BWP, DCI transmitted by a network side device, where the DCI includes an RA field; and the processor 800 is configured to read the program in the storage 820 to perform the following process:

determining, according to the size of the activated BWP, RA information indicated by the RA field.

The transceiver 810 may be configured to receive and transmit data under the control of the processor 800.

In FIG. 8, a bus architecture may include any quantity of interconnected buses and bridges. Specifically, various circuits such as one or more processors represented by the processor 800 and a storage represented by the storage 820 are linked together. The bus architecture may also link various other circuits such as peripherals, voltage regulators, and power management circuits, which are well known in the art, and therefore are not further described herein. A bus interface provides an interface. The transceiver 810 may include a plurality of elements, that is, a transmitter and a receiver, to provide units for communicating with various other apparatuses over a transmission medium.

The processor 800 is responsible for managing the bus architecture and general processing. The storage 820 can store data used by the processor 800 while performing operations.

It needs to be noted that the storage 820 is not limited to being located on the terminal. The storage 820 and the processor 800 may be located separately at different geographical locations.

Optionally, the DCI is transmitted in a CSS within a CORESET0, the activated BWP includes the entire CORESET0, and the CORESET0 is a CORESET configured in a PBCH.

Optionally, the determining, according to the size of the activated BWP, the RA information indicated by the RA field includes:

determining an RA granularity of the RA field according to the size of the activated BWP, and determining, according to the RA granularity, the RA information indicated by the RA field; or performing a padding operation or a truncation operation on the RA field according to the size of the activated BWP to obtain target information, and determining the RA information according to the target information.

Optionally, the determining the RA granularity of the RA field according to the size of the activated BWP includes:

determining the RA granularity of the RA field according to a comparison result between the size of the activated BWP and the size of an initial BWP;

or the performing the padding operation or the truncation operation on the RA field according to the size of the activated BWP to obtain the target information, and determining the RA information according to the target information includes:

performing the padding operation or the truncation operation on the RA field according to a comparison result between the size of the activated BWP and the size of an initial BWP to obtain the target information, and determining the RA information according to the target information.

Optionally, the determining the RA granularity of the RA field according to the comparison result between the size of the activated BWP and the size of the initial BWP includes:

if the size of the activated BWP is greater than the size of the initial BWP, determining that the RA granularity of the RA field is N VRBs, where N is an integer obtained by rounding down a quotient, and the quotient is a quotient of dividing the size of the activated BWP by the size of the initial BWP; or if the size of the activated BWP is greater than the size of the initial BWP, determining that the RA granularity of the RA field is M VRBs, where M is an integer obtained by rounding up a quotient, and the quotient is a quotient of dividing the size of the activated BWP by the size of the initial BWP; or if the size of the activated BWP is less than or equal to the size of the initial BWP, determining that the RA granularity of the RA field is one VRB.

Optionally, if the RA granularity is M VRBs, the first $\lceil \log_2(N_G^{BWP}(N_G^{BWP}+1)/2) \rceil$ bits in the RA field are valid or the last $\lceil \log_2(N_G^{BWP}(N_G^{BWP}+1)/2) \rceil$ bits in the RA field are valid, where $\lceil\ \rceil$ is rounding up, and $N_G^{BWP}$ is a quantity of RA granularities used for RA in the activated BWP.

Optionally, the performing the padding operation or the truncation operation on the RA field according to the comparison result between the size of the activated BWP and the size of the initial BWP to obtain the target information, and determining the RA information according to the target information includes:

if the size of the activated BWP is greater than the size of the initial BWP, determining, by the terminal, a target length of the RA field, after the bits of the RA field are obtained through decoding, first padding $L-L_{RA}$ 0s or 1s before the bits of the RA field to obtain the target information with L bits, and then determining the RA information according to the target information with the L bits, where L is equal to the target length, and $L_{RA}$ is the length of the RA field;

if the size of the activated BWP is greater than the size of the initial BWP, determining, by the terminal, a target length of the RA field, after the bits of the RA field are obtained through decoding, first padding $L-L_{RA}$ 0s or 1s after the bits of the RA field to obtain the target information with L bits, and then determining the RA information according to the target information with the L bits, where L is equal to the target length, and $L_{RA}$ is the length of the RA field; or if the size of the activated BWP is less than the size of the initial BWP, determining, by the terminal, a target length of the RA field, after the bits of the RA field are obtained through decoding, first performing truncation on the bits of the RA field to obtain first L bits or last L bits to obtain the target information with the L bits, and then determining the RA information according to the target information with the L bits, where L is equal to the target length.

Optionally, $L=\lceil \log_2(N_{RB}^{currentBWP}(N_{RB}^{currentBWP}+1)/2) \rceil$, where $\lceil\ \rceil$ is rounding up, and $N_{RB}^{currentBWP}$ is a quantity of RBs in the activated BWP.

Optionally, the DCI includes DCI whose CRC code is scrambled with a specific RNTI; and/or the length of the RA field is determined according to a size of an initial BWP of the terminal based on an RA granularity being one VRB.

It needs to be noted that the terminal in this embodiment may be the terminal in any implementation in the method embodiments of the present disclosure. Any implementation of the terminal in the method embodiments of the present disclosure may be achieved by the terminal in this embodiment, and the same beneficial effects can be achieved. Details are not described herein again.

Figure 9:
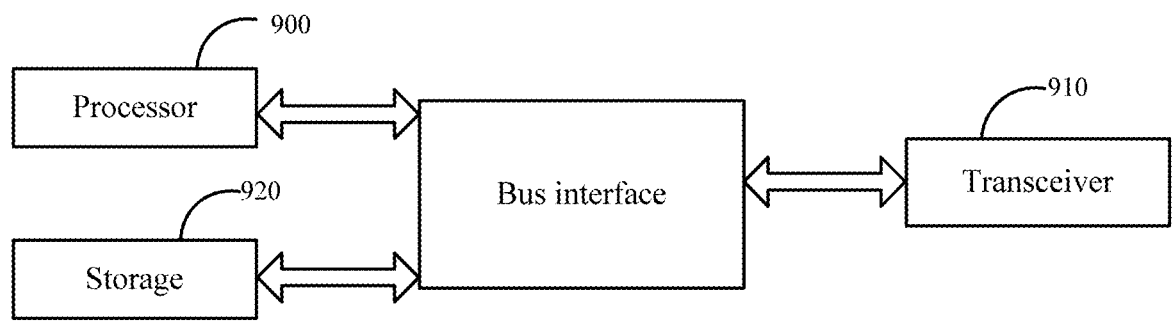
FIG. 9 is still another structural diagram of a network side device according to an embodiment of the present disclosure.

Referring to FIG. 9, FIG. 9 is another structural diagram of a network side device according to an embodiment of the present disclosure. As shown in FIG. 9, the network side device includes a transceiver 910, a storage 920, a processor 900, and a computer program stored in the storage 920 and configured to be executed by the processor, where the transceiver 910 is configured for generating DCI, where the DCI includes an RA field; and transmitting the DCI to a terminal in an activated BWP of the terminal, so that the terminal determines, according to the size of the activated BWP, RA information indicated by the RA field;

or the processor 900 is configured to read the program in the storage 920 to perform the following process:

generating DCI, where the DCI includes an RA field; and the transceiver 910 is configured for transmitting the DCI to a terminal in an activated BWP of the terminal, so that the terminal determines, according to the size of the activated BWP, RA information indicated by the RA field.

The transceiver 910 may be configured to receive and transmit data under the control of the processor 900.

In FIG. 9, a bus architecture may include any quantity of interconnected buses and bridges. Specifically, various circuits such as one or more processors represented by the processor 900 and a storage represented by the storage 920 are linked together. The bus architecture may also link various other circuits such as peripherals, voltage regulators, and power management circuits, which are well known in the art, and therefore are not further described herein. A bus interface provides an interface. The transceiver 910 may include a plurality of elements, that is, a transmitter and a receiver, to provide units for communicating with various other apparatuses over a transmission medium.

The processor 900 is responsible for managing the bus architecture and general processing. The storage 920 can store data used by the processor 900 while performing operations.

It needs to be noted that the storage 920 is not limited to being located on the network side device. The storage 920 and the processor 900 may be located separately at different geographical locations.

Optionally, the DCI is transmitted in a CSS within a CORESET0, the activated BWP includes the entire CORESET0, and the CORESET0 is a CORESET configured in a PBCH.

Optionally, the processor 900 or the transceiver 910 is further configured for:

determining an RA granularity of the RA field according to the size of the activated BWP; or determining that an RA granularity of the RA field is one VRB.

Optionally, the determining the RA granularity of the RA field according to the size of the activated BWP includes:

determining the RA granularity of the RA field according to a comparison result between the size of the activated BWP and the size of an initial BWP.

Optionally, the determining the RA granularity of the RA field according to the comparison result between the size of the activated BWP and the size of the initial BWP includes:

if the size of the activated BWP is greater than the size of the initial BWP, determining that the RA granularity of the RA field is N VRBs, where N is an integer obtained by rounding down a quotient, and the quotient is a quotient of dividing the size of the activated BWP by the size of the initial BWP; or if the size of the activated BWP is greater than the size of the initial BWP, determining that the RA granularity of the RA field is M VRBs, where M is an integer obtained by rounding up a quotient, and the quotient is a quotient of dividing the size of the activated BWP by the size of the initial BWP; or if the size of the activated BWP is less than or equal to the size of the initial BWP, determining that the RA granularity of the RA field is one VRB.

Optionally, if the RA granularity is M VRBs, the first $\lceil \log_2(N_G^{BWP}(N_G^{BWP}+1)/2) \rceil$ bits in the RA field are valid or the last $\lceil \log_2(N_G^{BWP}(N_G^{BWP}+1)/2) \rceil$ bits in the RA field are valid, where $\lceil \ \rceil$ is rounding up, and $N_G^{BWP}$ is a quantity of RA granularities used for RA in the activated BWP.

Optionally, the DCI includes DCI whose CRC code is scrambled with a specific RNTI; and/or the length of the RA field is determined according to a size of an initial BWP of the terminal based on an RA granularity being one VRB.

It needs to be noted that the network side device in this embodiment may be the network side device in any implementation in the method embodiments of the present disclosure. Any implementation of the network side device in the method embodiments of the present disclosure may be implemented by the network side device in this embodiment, and the same beneficial effects can be achieved. Details are not described herein again.

The present disclosure further provides in some embodiments a computer-readable storage medium storing therein a computer program, where the program is configured to be executed by a processor to implement the steps in the RA method on the terminal side provided in the embodiments of the present disclosure or implement the steps in the RA method on the network side device side provided in the embodiments of the present disclosure.

In several embodiments provided in the present application, it should be understood that the disclosed method and apparatus may be implemented in other forms. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, and may be electrical connections, mechanical connections, or connections in other forms.

In addition, functional units in the embodiments of the present disclosure may be integrated into one processing unit, or each of the units may exist alone physically, or two or more units are integrated into one unit. The integrated unit may be implemented in the form of hardware, or in the form of hardware plus software functional unit.

The integrated unit implemented in the form of a software functional unit may be stored in a computer-readable storage medium. The software functional units are stored in a storage medium, and include several instructions for instructing a computer device (which may be a personal computer, a server or a network device) to perform some steps of the methods in the embodiments of the present disclosure. The foregoing storage medium includes various media that can store program codes, such as a universal serial bus (USB) flash drive, a removable hard disk, a read-only memory (ROM), a random access memory (RAM), a magnetic disk or an optical disc.

The foregoing descriptions are preferred implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A resource allocation (RA) method, comprising:
   receiving, by a terminal within an activated bandwidth part (BWP), downlink control information (DCI) transmitted by a network side device, wherein the DCI comprises an RA field; and
   determining, by the terminal according to a size of the activated BWP, RA information indicated by the RA field;
   wherein the determining, by the terminal according to the size of the activated BWP, the RA information indicated by the RA field comprises:
   determining, by the terminal, an RA granularity of the RA field according to the size of the activated BWP, and determining, by the terminal according to the RA granularity, the RA information indicated by the RA field; or
   performing, by the terminal, a padding operation or a truncation operation on the RA field according to the size of the activated BWP to obtain target information, and determining, by the terminal, the RA information according to the target information;
   wherein the determining, by the terminal, the RA granularity of the RA field according to the size of the activated BWP comprises:
   determining, by the terminal, the RA granularity of the RA field according to a comparison result between the size of the activated BWP and a size of an initial BWP; or
   the performing, by the terminal, the padding operation or the truncation operation on the RA field according to the size of the activated BWP to obtain the target information, and determining, by the terminal, the PA information according to the target information comprises:
   performing, by the terminal, the padding operation or the truncation operation on the RA field according to a comparison result between the size of the activated BWP and a size of an initial BWP to obtain the target information, and determining, by the terminal, the RA information according to the target information.

2. The RA method according to claim 1, wherein the DCI is transmitted in a common search space (CSS) within a control resource set 0 (CORESET0), the activated BWP comprises the entire CORESET0, and the CORESET0 is a CORESET configured in a physical broadcast channel (PBCH).

3. The RA method according to claim 1, wherein the determining, by the terminal, the RA granularity of the RA field according to the comparison result between the size of the activated BWP and the size of the initial BWP comprises:
   in case that the size of the activated BWP is greater than the size of the initial BWP, determining, by the terminal, that the RA granularity of the RA field is N virtual resource blocks (VRBs), wherein N is an integer obtained by rounding down a quotient, and the quotient is a quotient of dividing the size of the activated BWP by the size of the initial BWP; or
   in case that the size of the activated BWP is greater than the size of the initial BWP, determining, by the terminal, that the RA granularity of the RA field is M VRBs, wherein M is an integer obtained by rounding up a quotient, and the quotient is a quotient of dividing the size of the activated BWP by the size of the initial BWP; or in case that the size of the activated BWP is less than or equal to the size of the initial BWP, determining, by the terminal, that the RA granularity of the RA field is one VRB.

4. The RA method according to claim 3, wherein in case that the RA granularity is M VRBs, first $\lceil \log_2(N_G^{BWP}(N_G^{BWP}+1)/2) \rceil$ bits in the RA field are valid or last $\lceil \log_2(N_G^{BWP}(N_G^{BWP}+1)/2) \rceil$ the RA field are valid, wherein $\lceil \ \rceil$ is rounding up, and $N_G^{BWP}$ is a quantity of RA granularities used for RA in the activated BWP.

5. The RA method according to claim 1, wherein the performing, by the terminal, the padding operation or the truncation operation on the RA field according to the comparison result between the size of the activated BWP and the size of the initial BWP to obtain the target information, and determining, by the terminal, the RA information according to the target information comprises:

in case that the size of the activated BWP is greater than the size of the initial BWP, determining, by the terminal, a target length of the RA field, after bits of the RA field are obtained through decoding, first padding, by the terminal, L-$L_{RA}$ 0s or 1s before the bits of the RA field to obtain the target information with L bits, and then determining, by the terminal, the RA information according to the target information with the L bits, wherein L is equal to the target length, and $L_{RA}$ is the length of the RA field; or in case that the size of the activated BWP is greater than the size of the initial BWP, determining, by the terminal, a target length of the RA field, after bits of the RA field are obtained through decoding, first padding, by the terminal, L-$L_{RA}$ 0s or 1s after the bits of the RA field to obtain the target information with L bits, and then determining, by the terminal, the RA information according to the target information with the L bits, wherein L is equal to the target length, and $L_{RA}$ is the length of the RA field; or in case that the size of the activated BWP is less than the size of the initial BWP, determining, by the terminal, a target length of the RA field, after bits of the RA field are obtained through decoding, first performing truncation, by the terminal, on the bits of the RA field to obtain first L bits or last L bits to obtain the target information with the L bits, and then determining, by the terminal, the RA information according to the target information with the L bits, wherein L is equal to the target length.

6. The RA method according to claim 5, wherein L=$\lceil \log_2(N_{RB}^{currentBWP}(N_{RB}^{currentBWP}+1)/2) \rceil$, wherein $\lceil \ \rceil$ is rounding up, and $N_{RB}^{currentBWP}$ is a quantity of resource blocks (RBs) in the activated BWP.

7. The RA method according to claim 1, wherein the DCI comprises DCI whose cyclic redundancy check (CRC) code is scrambled with a specific radio network temporary identifier (RNTI); and/or a length of the RA field is determined according to a size of an initial BWP of the terminal based on an RA granularity being one VRB; and/or a length of the RA field is determined according to an initial downlink (DL) BWP.

8. A terminal, comprising: a transceiver, a storage, a processor and a program stored in the storage and configured to be executed by the processor, wherein the processor is configured to read the program in the storage to implement steps in the resource allocation (RA) method according to claim 1.

9. A non-transitory computer-readable storage medium storing therein a computer program, wherein the computer program is configured to be executed by a processor to implement steps in the resource allocation (RA) method according to claim 1.

10. A resource allocation (RA) method, comprising:
generating, by a network side device, downlink control information (DCI), wherein the DCI comprises an RA field; and transmitting, by the network side device, the DCI to a terminal in an activated bandwidth part (BWP) of the terminal, so that the terminal determines, according to a size of the activated BWP, RA information indicated by the RA field;

wherein the RA method further comprises:
determining, by the network side device, an RA granularity of the RA field according to the size of the activated BWP;

wherein the determining, by the network side device, the RA granularity of the RA field according to the size of the activated BWP comprises:

determining, by the network side device, the RA granularity of the RA field according to a comparison result between the size of the activated BWP and a size of an initial BWP.

11. The RA method according to claim 10, wherein the DCI is transmitted in a common search space (CSS) within a control resource set 0 (CORESET0), the activated BWP comprises the entire CORESET0, and the CORESET0 is a CORESET configured in a physical broadcast channel (PBCH).

12. The RA method according to claim 10, wherein the DCI comprises DCI whose cyclic redundancy check (CRC) code is scrambled with a specific radio network temporary identifier (RNTI); and/or a length of the RA field is determined according to a size of an initial BWP of the terminal based on an RA granularity being one VRB; and/or a length of the RA field is determined according to an initial downlink (DL) BWP.

13. A network side device, comprising: a transceiver, a storage, a processor, and a program stored in the storage and configured to be executed by the processor, wherein the processor is configured to read the program in the storage to implement steps in the RA method according to claim 10.

14. A non-transitory computer-readable storage medium storing therein a computer program, wherein the computer program is configured to be executed by a processor to implement steps in the RA method according to claim 10.

15. The RA method according to claim 10, wherein the determining, by the network side device, the RA granularity of the RA field according to the comparison result between the size of the activated BWP and the size of the initial BWP comprises:

in case that the size of the activated BWP is greater than the size of the initial BWP, determining, by the network side device, that the RA granularity of the RA field is N VRBs, wherein N is an integer obtained by rounding down a quotient, and the quotient is a quotient of dividing the size of the activated BWP by the size of the initial BWP; or in case that the size of the activated BWP is greater than the size of the initial BWP, determining, by the network side device, that the RA granularity of the RA field is M VRBs, wherein M is an integer obtained by rounding up a quotient, and the quotient is a quotient of dividing the size of the activated BWP by the size of the initial BWP; or in case that the size of the activated BWP is less than or equal to the size of the initial BWP, determining, by the network side device, that the RA granularity of the RA field is one VRB.

16. The RA method according to claim 15, wherein in case that the RA granularity is M VRBs, first $\lceil \log_2(N_G^{BWP}(N_G^{BWP}+1)/2) \rceil$ bits in the RA field are valid or last $\lceil \log_2(N_G^{BWP}(N_G^{BWP}+1)/2) \rceil$ the RA field are valid, wherein $\lceil \ \rceil$ is rounding up, and $N_G^{BWP}$ is a quantity of RA granularities used for RA in the activated BWP.

* * * * *